United States Patent [19]

Grimaud et al.

[11] Patent Number: 4,772,804
[45] Date of Patent: Sep. 20, 1988

[54] PROCESS AND DEVICE FOR SENDING ELECTRICAL CURRENT INTO A CIRCUIT USING A TRANSISTOR

[75] Inventors: Jean-Michel Grimaud, Grenade; Jean-Pierre Loncle, Muret; Dominique Salafia, Tournefeuille, all of France

[73] Assignee: Bendix Electronics S.A., Toulouse, France

[21] Appl. No.: 31,308

[22] Filed: Mar. 26, 1987

[30] Foreign Application Priority Data

Apr. 2, 1986 [FR] France .................. 86 04706

[51] Int. Cl.⁴ .............................................. H02J 3/14
[52] U.S. Cl. ........................... 307/10 LS; 307/10 R; 340/80; 340/641; 340/642; 315/83; 324/83 D
[58] Field of Search .............. 307/9, 10 R, 10 LS, 307/10 BP; 340/52 R, 52 D, 52 F, 74, 75, 113, 57, 73, 80, 79, 83, 641, 642, 643; 315/82, 83, 129, 130; 324/83 D

[56] References Cited

U.S. PATENT DOCUMENTS

| | | |
|---|---|---|
| 3,801,975 | 4/1974 | Kitano .......................... 340/642 X |
| 3,987,424 | 10/1976 | Brouwer et al. ............... 340/80 X |
| 4,173,750 | 11/1979 | Riba .............................. 340/80 |
| 4,234,878 | 11/1980 | Stark ............................. 340/642 |
| 4,258,292 | 3/1981 | Kassfeldt ....................... 307/10 LS |
| 4,284,974 | 8/1981 | Ishida et al. .................. 340/73 X |
| 4,297,692 | 10/1981 | Maier ............................. 340/641 X |
| 4,349,810 | 9/1982 | Kugo et al. ..................... 340/79 |
| 4,385,283 | 5/1983 | Delapierre ..................... 340/642 X |
| 4,451,822 | 5/1984 | Verse et al. ................... 340/642 |
| 4,572,987 | 2/1986 | Webb . | |
| 4,574,266 | 3/1986 | Valentine ....................... 340/52 F |
| 4,639,609 | 1/1987 | Floyd et al. .................... 307/10 R |
| 4,654,645 | 3/1987 | Yamagishi ...................... 340/641 X |
| 4,661,717 | 4/1987 | Nishioka ........................ 340/80 X |
| 4,667,187 | 5/1987 | Volk et al. .................... 307/10 LS X |

FOREIGN PATENT DOCUMENTS

0124963 9/1984 United Kingdom .

Primary Examiner—William M. Shoop, Jr.
Assistant Examiner—Paul Ip
Attorney, Agent, or Firm—Russel C. Wells; Markell Seitzman

[57] ABSTRACT

The process and the device enable the electrical powering of a circuit having a conductor (1) with high thermal inertia by means of a transistor (3) with low thermal inertia. According to the invention, the device comprises a current limiter circuit (4,5,7,11), a voltage detector circuit (8) and a control microprocessor (6) which, according to a pre-established program, controls the flowing and stoppage of current in the power transistor (3) controlling the powering of the conductor (1) with high thermal inertia.

Application to the control of lights in automobile vehicles.

7 Claims, 5 Drawing Sheets

PROCESS AND DEVICE FOR SENDING ELECTRICAL CURRENT INTO A CIRCUIT USING A TRANSISTOR

The present invention relates to a process for sending electrical current into an electrical circuit comprising a conductor with high thermal inertia and a transistor with low thermal inertia, and to the application of this process to the lighting of the headlights of a vehicle.

In automobile vehicles (light vehicles or industrial vehicles) the control of the lighting or signaling bulbs (headlights, flashers, stop lights . . . ) is currently carried out either directly by means of the switch controlled by the driver, or via a relay controlled from the dashboard.

These two types of control are very similar in electrical terms since in both cases, the closing of the power circuit is carried out by a contact.

In fact, the first system is tending to disappear for all high power controls because of difficulties in wiring due to the passage of wires of large cross-section into the passenger space.

Control by relays, although simple and relatively economical, has two major disadvantages:
  on the one hand, the lifetime of the contact is limited,
  on the other hand, the protection of the relay is difficult to provide in the case in which a short-circuited load is being controlled.

With regard to these traditional techniques, it is becoming apparent that transistors are having to be used because of the removal of the disadvantages that have just been listed, and also by the fact that it is easy to make use of the short-circuit and open-circuit data which are necessary for the protection of the semiconductor control circuit, in order to transmit them to an element which informs the driver of the state of the bulbs, or other consuming devices in his vehicle.

Transistors are not yet widely used in this field because of particular specific limitations: on the one hand the resistance of a cold bulb is very much lower, in the order of 10 to 20 times, than that of a hot bulb. The result of this is that the initial current can have an intensity that is 10 to 20 times higher than its normal operating values. A transistor, on the other hand, does not well withstand having to dissipate a relatively large power for a prolonged time, or a higher power for a shorter time. For example a transistor will "blow" if it has to dissipate 250 watts for 10 ms, or 450 watts for 1 ms.

Another limitation results from the regulations which, in many cases, requires that the time which elapses before the moment at which the bulb is full on is less than, for example, 10 ms.

It is necessary that a lamp lighting circuit is, as mentioned above, capable of detecting short-circuits and is protected from these short-circuits.

There are therefore several problems to solve:

(1) The lighting phase must have a sufficiently short duration to satisfy regulations, but the power dissipated by the transistors in this phase must be maintained within acceptable limits.

(2) In the case of a total short-circuit, it is necessary for the protection system to react before the transistor is out of its safety zone, defined by a maximum current and a maximum power.

(3) In the case of a unclear short-circuit, the power dissipated before detection must be acceptable.

It seems obvious to consider limiting the current in order to allow for the limits of the transistor. However, a deeper study of the question shows the following results:

(a) If the current is limited to a low value, a little higher than that corresponding with the permanent rating, the time necessary to light the bulb to its rated level will be slow and risks exceeding the regulation limit. Also, the transistor will have to dissipate an appreciable power throughout the temperature rise time. If there is a short-circuit, this can only be detected after the time of this transitory period, which further increases the energy to be dissipated by the transistor.

(b) If a higher limit is chosen for the current, between the maximum current corresponding with a cold bulb and the permanent rating current, the lighting time is reduced as well as the total power to dissipate, but the instantaneous power increases and the transistor again runs the risk of blowing.

(c) If an even higher limit is chosen, the risk of blowing can be reduced because of the corresponding reduction in the lighting time of the bulb, but the risk remains and is intensified in the case of short-circuit.

The following observation was the starting point for solving the problem:

When the bulb is at low temperature, which can be considered as true during the major part of the lighting phase, heat losses by radiation are very low. In fact they are proportional to the third power of the temperature difference between the filament and the surrounding environment. In addition, the thermal capacity of the filament, and therefore the cooling time constant are very high. It can therefore be considered that all the energy supplied is stored in the filament, and that this filament, if it is compared to an electrical component, behaves, like a pure capacitor.

On the other hand, semiconductors have much lower thermal capacities and time constants, but the thermal resistances between a silicon chip and a heat-sink, which can be considered as at constant temperature, are also very low. The semiconductor does not therefore have the ability to store energy, but it can more easily discharge the power supplied to it.

It results from this that if the supplied energy is chopped at a sufficiently high frequency, the power transistor rapidly reaches thermal equilibrium, where the mean supplied power is equal to the discharged power, while the filament stores the greater part of this energy without returning it. Therefore, according to the present invention, there is provided a process for sending electrical current into a circuit comprising a conductor with high thermal inertia and whose temperature is required to be raised rapidly, and a transistor with low thermal inertia and likely to be damaged by extreme heating, which has as a feature the fact that the current is divided into pulses whose duration, peak current and spacing are defined in such a way that the temperature of the transistor, after a series of pulses, reaches an approximately stable operating value fixed in advance and not likely to damage it, the electrical energy passing through the transistor however being sufficient to heat the conductor at a speed at least equal to a value fixed in advance.

When the conductor with high thermal inertia has a resistance which increases as a function of temperature, it is advantageously provided that, after the resistance of the conductor with high thermal inertia has reached a value such that it limits the peak current to a value lower than that which has been chosen for the initial phase, the duration/spacing ratio of the pulses is increased so that the temperature of the transistor again approaches the operating value without however exceeding it, and that the speed of heating the conductor is raised.

The mode of operation that has just been described must preferably be completed by precautions to prevent the presence of a short-circuit from being a risk of damage to a power transistor, a relatively expensive part.

For this purpose provision is advantageously made that during the first phase in which the peak current is maintained equal to the chosen value, a short-circuit is detected by comparing the voltage drop in the transistor with a check value of this voltage drop, and that, in the following phases in which the peak current is normally controlled by the resistance of the conductor with high thermal inertia, a short-circuit is detected by comparing the observed peak current with a check value of this current.

According to preferred embodiments:

the detection of a short-circuit is begun by current comparison after a time that is fixed in advance, and longer than the normal time necessary for the resistance of the conductor with high thermal inertia to start limiting the peak current, the check value of the current for detecting a short-circuit is lower than the limit current chosen for the initial phase.

In the case in which current is simultaneously sent into several circuits arranged in parallel and each containing at least one conductor with high thermal inertia, preferably, when a short-circuit is detected by current comparison in one of the circuits, the process of sending current into all of the circuits is stopped, those of the circuits which are short-circuited are detected, and then the process of sending current into all of the circuits is repeated excluding those which are short-circuited. The invention also provides a device for the implementation of the process that has just been described, device which can be used, in particular, for controlling the lights of a vehicle, and which comprises:

a power transistor placed in the circuit of the conductor to be fed, a current limiter connected to a terminal of the power transistor, a means of measuring the voltage across the terminals of the power transistor, a means of comparing the current passing through the power transistor with a chosen limit current, a control processor which, according to a pre-established program, controls the flowing and stoppage of the current in the power transistor and fixes the limit currents in this transistor, and which interrupts the execution of this program when the signals given by the means of measuring voltage and/or by the means of current comparison correspond with the existence of a short-circuit likely to damage the power transistor.

In the case in which such a device is intended to control several circuits arranged in parallel and each including at least one conductor with high thermal inertia, it is advantageously provided that each circuit is connected to a power transistor with a current limiter, a means of measuring the voltage at the terminals of the power transistor and a means of current comparison and that a processor common to the various circuits includes a means of general switching controlled by the output of the means of current comparison, and means of searching for the presence of a short-circuit in each of the controlled circuits, in order to isolate the circuits found to be short-circuited and to restart the process on the other circuits.

The invention will now be described in more detail by means of a practical example, with reference to the accompanying drawings in which.

Figure 1:
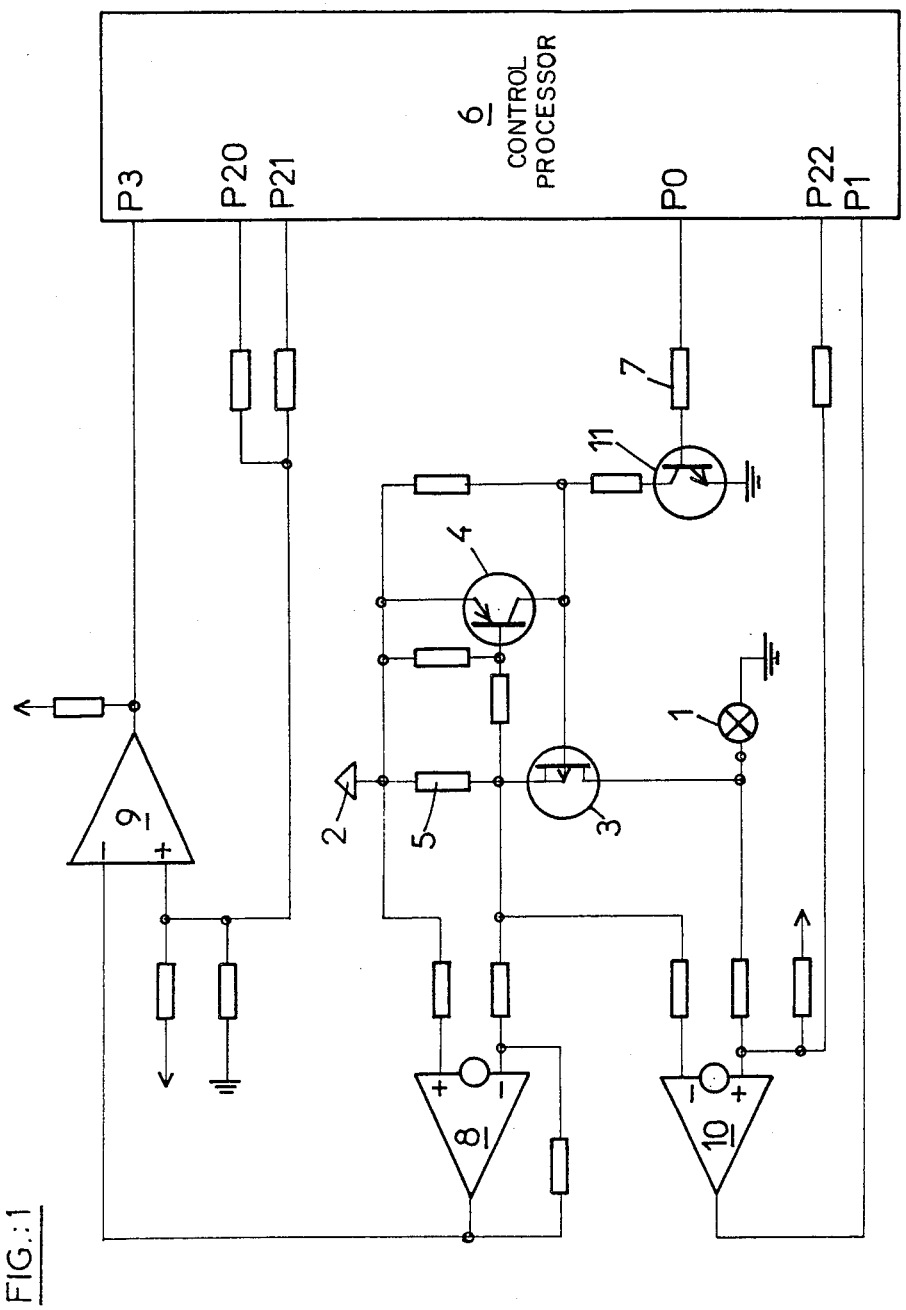
FIG. 1 is an overall block diagram.

The device described in FIG. 1 is intended to feed a conductor or bulb 1 from an energy source 2 (vehicle battery), through an MOS transistor 3 serving as a switch.

The switch 3 is controlled by an output P0 of the control processor 6 through a resistor 7 and a transistor 11.

The switch 3 is limited current-wise by a current limiting system which comprises a transistor 4 whose emitter and base are connected to the two terminals of a shunt resistor 5 placed between the source 2 and the switch 3.

A first short-circuit detection circuit comprises an amplifier 8, connected to the terminals of the shunt resistor 5. The voltage difference is compared with a previously fixed value in a comparator 9. The previously fixed value is provided by outputs P20 and P21 of the control processor. The signals from the comparator are sent to input P3 of the processor 6.

A second short-circuit detection circuit comprises a second amplifier 10, connected to the terminals of the switch 3 and whose threshold value is controlled by output P22 of the processor. The signals from the amplifier 10 are sent to input P1 of the processor 6.

The functioning is as follows when there is no short-circuit: the processor has in its memory a series of current level thresholds in decreasing order, and associates a number of "loops" with each threshold, each loop comprising a current flowing time and a current off time. The loops associated with a current threshold are all the same, but to each threshold value there is associated a different or identical value of the number of loops and of current running or stoppage times.

The corresponding signals are applied to the switch 3 by means of the transistor 11. When the number of loops corresponding with the given threshold has been executed, the processor passes to the next, immediately lower threshold.

At normal times, the current is limited by the impedance of the device, the first detection circuit therefore acts in the standard way by detecting an abnormally high current in the shunt resistor 5, which commands the stoppage of the current sending command by the processor.

During the start of operation period, the current is effectively limited by the current limiter, the first detection circuit is therefore ineffective. The second detection circuit is therefore called upon, this circuit compares the voltage drop in the switch 3 with a limit value and commands the stoppage of the process if this value is exceeded.

The choice of this voltage drop limit value V1 is associated with that of the current limit value I1 and with the ratio t of the current flowing and stoppage times. To avoid damaging the transistor, it is in fact necessary that: $V1 \times I1 \times t$ should be less than or equal to P, P being the maximum power that the transistor can withstand in continuous operation.

It will be noted that, for the same reasons, the value of the current threshold Is imposed by the first short-circuit detection system must be such that: $Z \times (Is)^2 \times t$ is less than or equal to P, Z being the equivalent electrical impedance of the switch.

The value of Is is preferably less than the limit current I1 as a consequence of a higher value of t. For this reason, at the start of an operation, the processor is programmed to disregard the signals from the comparator 9 at least while the first threshold is being operated with.

Figure 2:
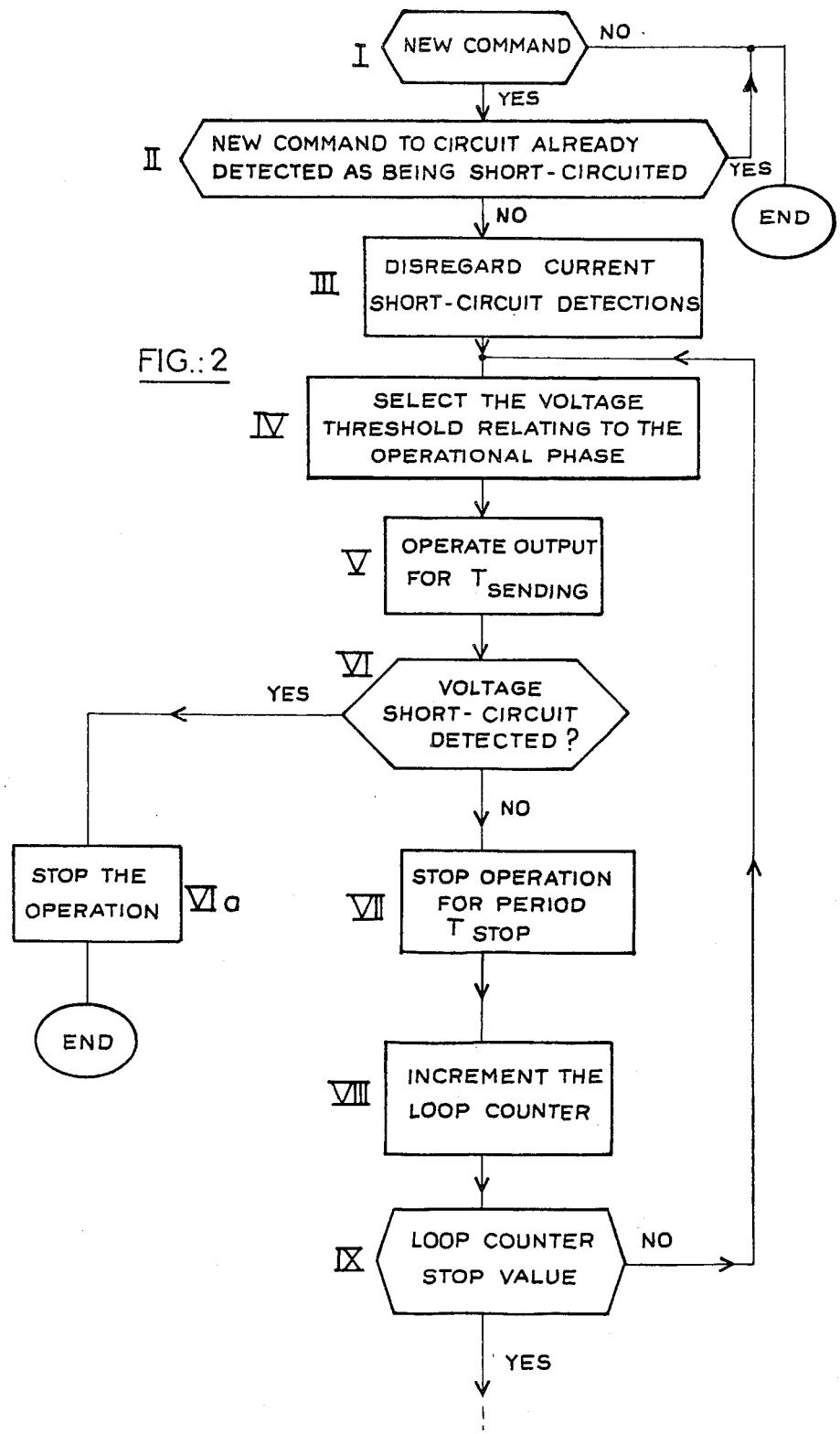
FIG. 2 is a flowchart of the initial phase of the process.
Figure 3:
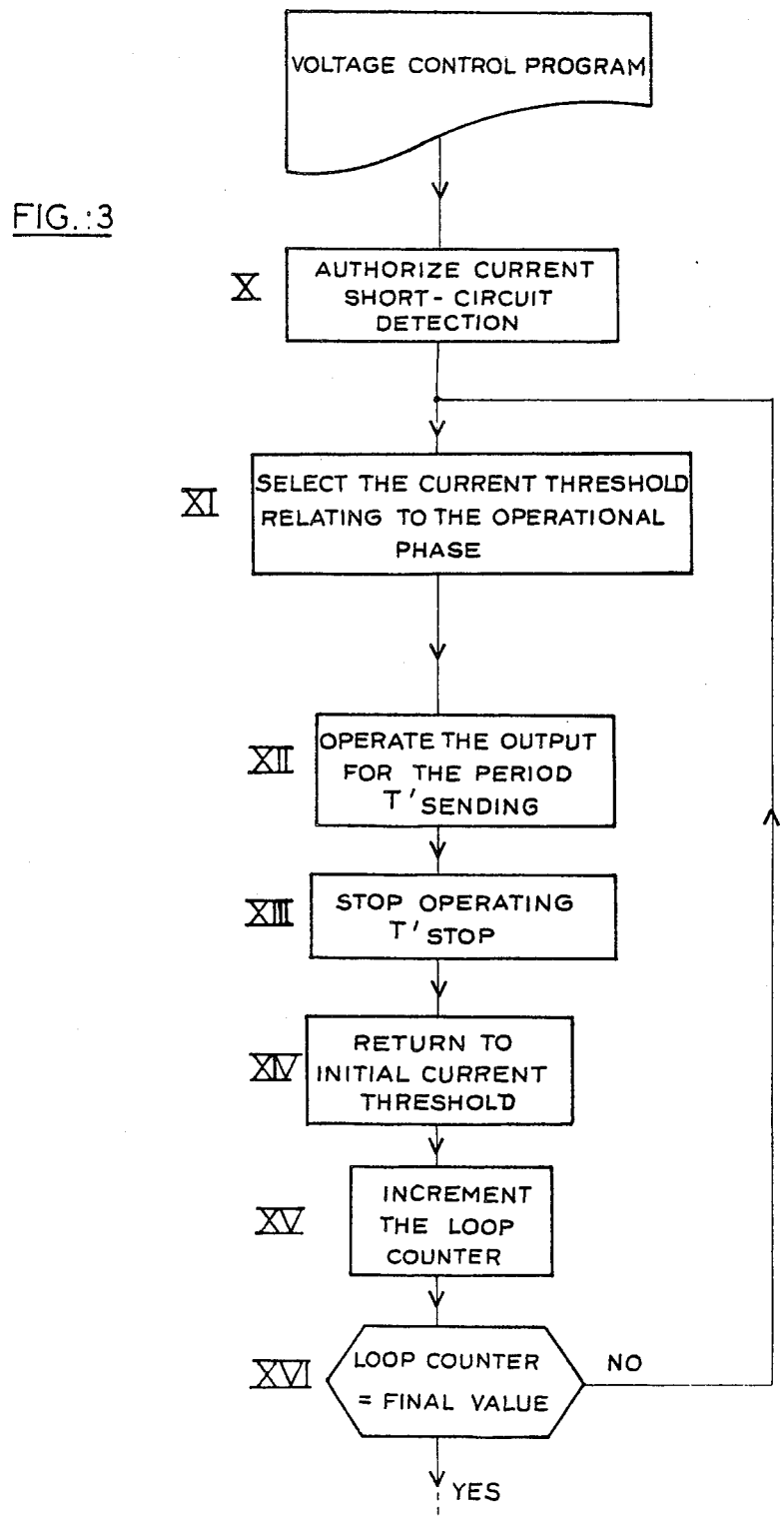
FIG. 3 is a flowchart of the next phase of the process.

FIGS. 2 and 3 show the flowcharts of a series of loops in the stages in which the current is limited by the device and in those in which it is not limited.

The flowchart in FIG. 2 relates to the operations corresponding with the start of a current sending operation.

After having checked that it is truly a start of operation corresponding with a new command (stage I) and having eliminated the case of a circuit already detected as being short-circuited (stage II), the system which detects short-circuits by current comparison is neutralized (stage III), which amounts to neutralizing output P3. In stage IV is selected, from among various pre-established thresholds, the voltage threshold relating to the operational phase concerned. In the case of the first phase, output P22 is put into the state corresponding with the highest voltage threshold, which amounts to fixing the threshold level of the current passing through the shunt resistor 5 beyond which input P3 changes state on detecting a short-circuit.

In stage V, P0 is operated on in order to command the flowing of current at the maximum chosen level through the switch 3, for a time $T_{sending}$.

If, during this time $T_{sending}$ the input P1 passes from the 0 state to the 1 state (stage VI), this indicates the existence of a short-circuit, and the process is stopped (stage VIa). Otherwise, at the end of the time $T_{sending}$, P0 is again operated on in order to command the switching off of the current for a time $T_{stoppage}$ (stage VII). A loop counter receives a unit increment (stage VIII), and then the total number of loops recorded by the counter is compared with the total set for the phase concerned (stage IX), and depending on the answer, a new loop is started from stage IV, or a following stage is passed onto as described in FIG. 3.

Figure 5:
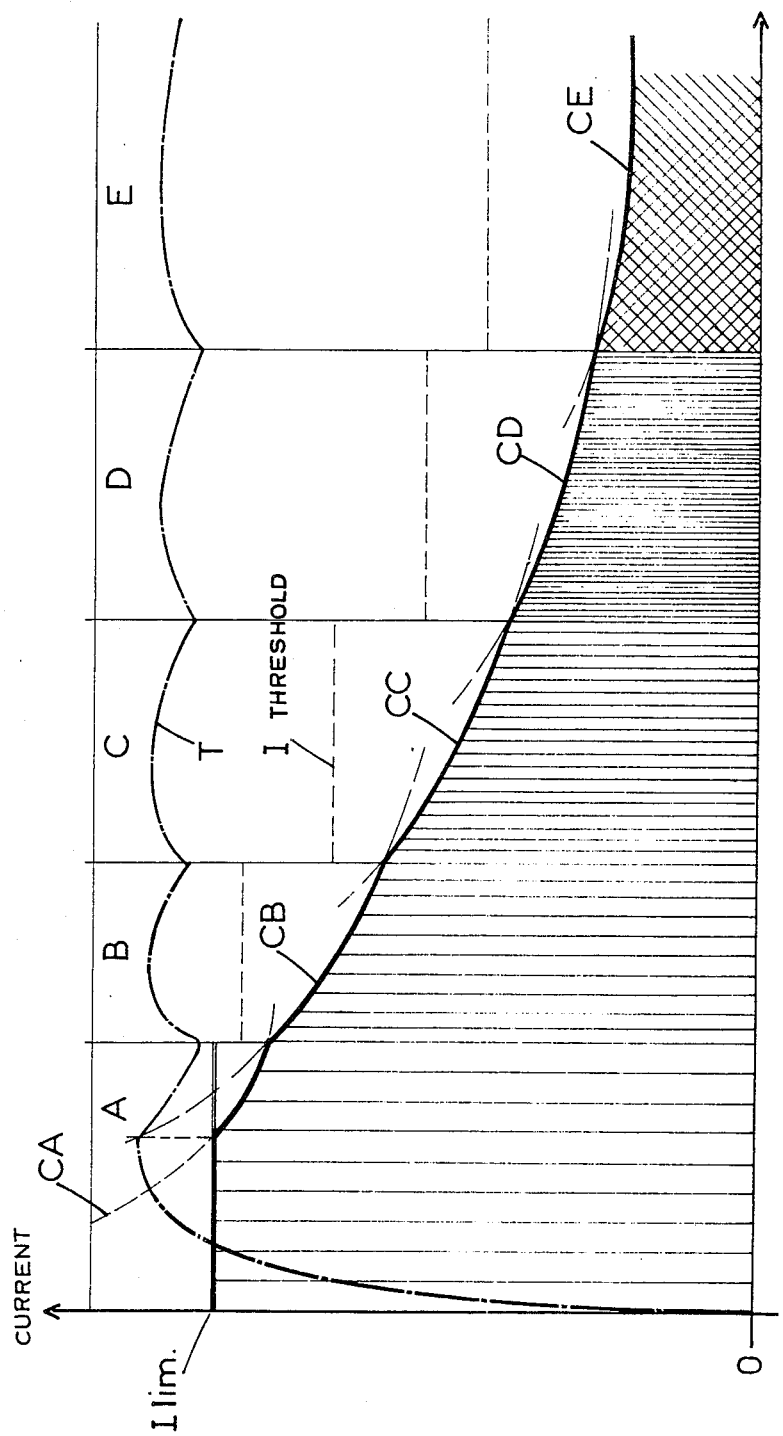
FIG. 5 is a schematic diagram of the emitted current.

In the case shown in FIG. 5, the voltage threshold selected in phase IV is the same for all the loops like those that have just been described. It is possible however, after having executed a specified number of loops with a first threshold value selected in phase IV, to provide for the execution of a second series of loops with a second threshold value, lower than the first one, and even a third series, etc. . . . before passing on to the next phase which corresponds with FIG. 3.

The following phases correspond with the situation in which the current limit is imposed by the lamp 1 and not by the device itself, with the result that the short-circuit detection is carried out by current comparison. A prior stage X consists therefore in making this detection possible by deneutralizing input P3.

In stage XI, P20 and/or P21 are operated on in order to determine the reference voltage applied to the comparator 9, which amounts to fixing the threshold level of the current passing through the shunt resistor 5 beyond which input P3 changes state on detecting a short-circuit.

The successive stages XII and XIII command the flowing of the current in the switch for a time $T'_{sending}$ and its stoppage for a time $T'_{stoppage}$ respectively by operating on output P0. These times are, as mentioned above, different from $T_{sending}$ and $T_{stoppage}$ of the first loops, the ratio of the current sending and stoppage times increases in successive phases until a continuous flow of current is reached.

After the start of stage XIII, in a stage XIV, the outputs P20 and P21 return to their initial values, and two stages XV and XVI increment a loop counter and compare the number of loops completed with the number of loops set for the phase. Once this phase is executed, the sequence passes on to a new phase, defined by different values of current threshold (settings of P20 and P21), of current sending and stoppage times, and of the number of loops, the last phase being that of sending the current continuously.

FIGS. 1 to 3 relate to the sending of current into a single lamp, whereas a vehicle is always fitted with a number of lamps that is greater than one.

Figure 4:
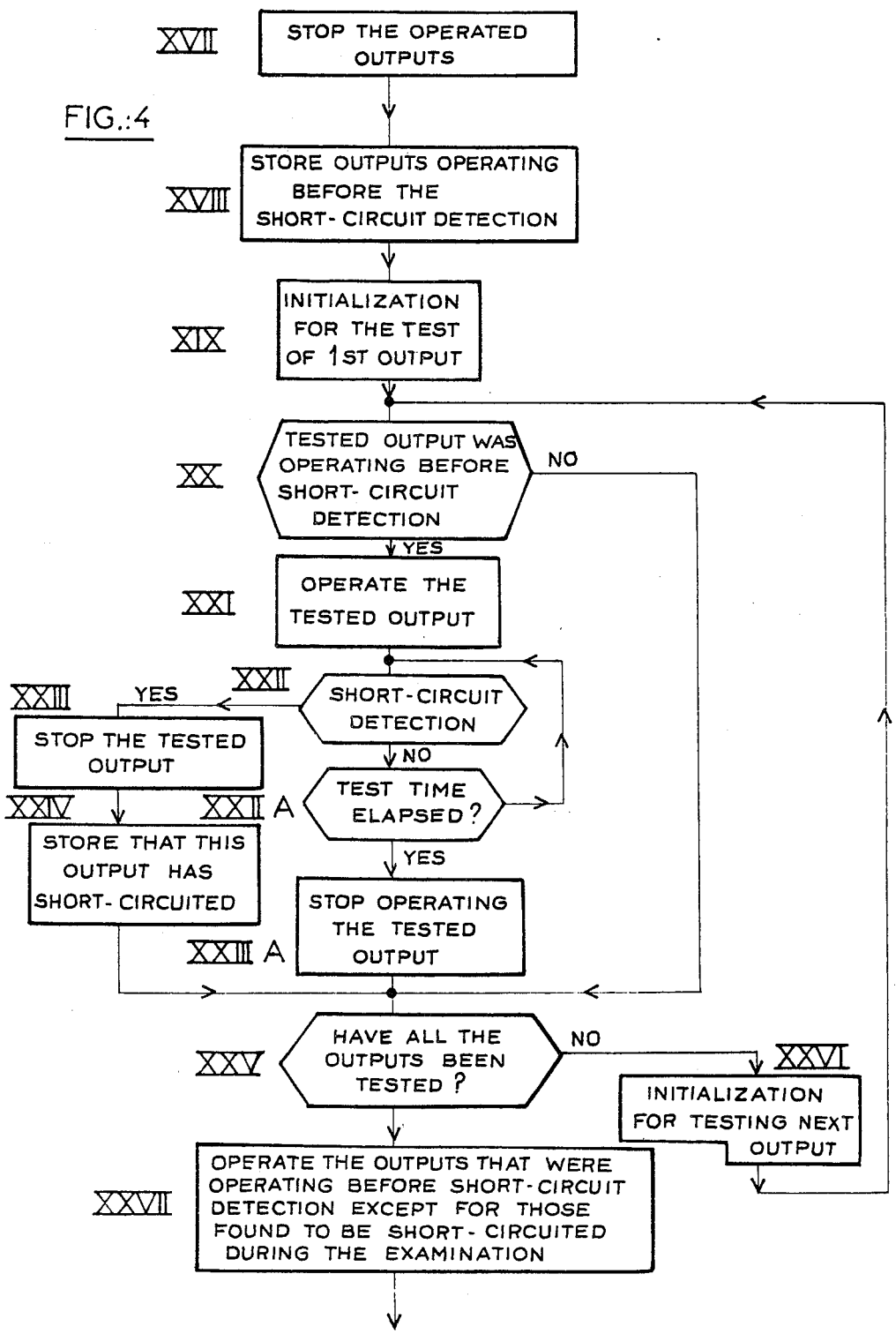
FIG. 4 is a flowchart of the detection of short-circuits by current comparison.

In practice, it is necessary for a power transistor to be associated with each lamp, or with each group of lamps operating in parallel, but it is preferable for there to be a single control processor. In this case, the processor 6 comprises as many outputs P0 and inputs P1 as there are power transistor 3, each transistor 3 also being associated with its own short-circuit detection systems. Also, for safety reasons it is advantageous to arrange for short-circuit detection to be carried out on all the lamp circuits at the beginning of the phase that is the subject of FIG. 3 described above. This detection, authorized after stage X, is the subject of FIG. 4 which describes a subroutine.

The passing of P3 to the "zero" state, resulting from a short-circuit detection, conditions entry into this subroutine. The first action commands the stoppage of all the outputs P0, designated by P0o . . . P0m, P0n etc. (stage XVII). The outputs Po which are operating at the beginning of the subroutine are then put into memory (stage XVIII), then the test is started begining with the first output P0o (stage XIX). A check is made to see if the test output (P0n) was among those stored as operating at stage XVIII (stage XX), then this output is operated (stage XXI). If a short-circuit is detected by input P3 (stage XXII), the tested output P0n is stopped, and it is stored (stages XXIII and XXIV). If there is no short-circuit detection, stage XXII is possibly repeated after checking the elapsed time (stage XXIIA), then the corresponding output is stopped (stage XXIIIA).

In a stage XXV it is checked if all the P0 outputs (i.e. all the lamp circuits) have been tested. If not, in a stage XXVI, the test for a new output is initialized by restarting at stage XX. When all the outputs have been tested, all those for which no short-circuit has been detected are put into operation in a stage XXVII. The corresponding signals are sent to stage X (FIG. 3).

FIG. 5 is a symbolic diagram of current as a function of time. This figure shows a process in five phases, A to E. At the start of phase A, the current is limited to the value Ilim fixed by the device. Towards the end of phase A, the resistance of the lamp has increased, and the current is limited by this resistance which increases as the lamp heats up (Curve CA). The process then moves to Phase B, where the ratio of the current sending and stoppage durations is greater. This results in a faster heating of the lamp which is shown by a current limiting curve CB which has a steeper slope. The variation in the temperature of the power transistor 3 is represented symbolically by the curve T. When this temperature has lowered, the process moves to the next phase, the characteristics of each phase are chosen in such a way that the temperature of the transistor remains below the appropriate limit in order to avoid any risk of damage, and at the same time in order to obtain a rapid heating of the lamp. Phase E corresponds with the continuous sending of current. The current sending process according to the invention is therefore completed. Horizontal lines (Ithreshold) represent the current values which when exceeded correspond with the detection of a short-circuit.

We claim:

1. A method for testing a lighting device having a high thermal inertia and a high temperature rise comprising the steps of:
   supplying electrical current to the lighting device and a transistor with low thermal inertia;
   dividing, in the initial phase, the current into pulses having a duration/spacing ratio and an initial peak current for controlling the temperature of the transistor, to reach a predetermined stable operating value, the electrical current passing through the transistor however being sufficient to heat the lighting device at a speed at least equal to a value fixed in advance;
   comparing the voltage drop in the transistor with a check value, to detect a short-circuit in the lighting device;
   increasing, in the succeeding phases and with no detected short circuit, the duration/spacing ratio and the peak current of said current pulses so that the temperature of the transistor again approaches said operating value without exceeding it, thereby raising the speed of heating the lighting device;
   comparing the measured peak current with a check value for detecting a short-circuit in the lighting device after a time that is fixed in advance, and longer than the normal time necessary for the resistance of the lighting device with high thermal inertia to start limiting the peak current; and then indicating the presence of a short-circuit in the lighting device.

2. A method according to claim 1, where in the step for comparing the measured peak current with a check value of this current, the peak current to detect a short-circuit is lower than the initial peak current chosen for said initial phase.

3. A method according to claim 1, where in the step of supplying current includes supplying current simultaneously into several circuits arranged in parallel and each containing at least one lighting device with high thermal inertia;
   and the step of comparing the observed peak current when a short-circuit is detected by current comparison in one of said circuits, supplying current into all of said circuits is stopped,
   identifying those of said circuits which are short-circuited, and then
   supplying current into all of said circuits is repeated excluding those which are short-circuited.

4. A system for controlling the lights of a vehicle, comprising:
   a power transistor (3),
   a current limiter (4) connected to a terminal of said power transistor for limiting the flow of current through said power transistor,
   means (10) for measuring the voltage across the terminals of said power transistor,
   means (5,8) for comparing the current passing through said power transistor with a chosen limit current, and
   a control processor (6) having a pre-established program controlling the flowing and stoppage of said current in said power transistor and fixing the limit of said current in said transistor,
   said processor interrupting the execution of said program when said means for measuring the voltage or said means for comparing the current indicates a short-circuit likely to damage said power transistor.

5. A system for controlling several circuits arranged in parallel and each circuit including at least one conductor with high thermal inertia, the system comprising:
   power transistor means connected in each of the circuits;
   a current limiter connected to said power transistor means;
   means for measuring the voltage at the terminals of said power transistor means;
   means for comparing the current through said power transistor means; and
   a processor common to the circuits for controlling the flowing and stoppage of the current in said power transistor means including general switching means controlled by the output of said means for comparing the current, and means for searching for the presence of a short-circuit in each of the circuits and for isolating the circuits found to be short-circuited.

6. A method for controlling the lights of a vehicle, comprising:
   supplying current to the lights through a power transistor (3),
   limiting the flow of current through said power transistor by means of a current limiter connected to said power transistor,
   measuring the voltage across the terminals of said power transistor,
   comparing the current passing through said power transistor with a chosen limit current, and
   controlling the flowing and stoppage of said current in said power transistor and fixing the limit of said current in said transistor by a control processor (6) having a pre-established program, and then
   interrupting the execution of said program when said measuring the voltage or said comparing the current indicates a short-circuit likely to damage said power transistor.

7. A method for controlling several circuits arranged in parallel with each circuit including at least one conductor with high thermal inertia, the method comprising the steps of:
   connecting power transistor means in each of the circuits;
   connecting a current limiter to each of said power transistor means;
   measuring the voltage at the terminals of each of said power transistor means;
   comparing the current through each of said power transistor means; and
   controlling the flowing the stoppage of the current in said power transistor means by general switching means with a processor common to the circuits;
   searching for the presence of a short-circuit in each of the circuits, and then
   isolating the circuits found to be short-circuited.

* * * * *